(12) United States Patent
Kennemer et al.

(10) Patent No.: US 9,457,631 B1
(45) Date of Patent: Oct. 4, 2016

(54) MULTI-USE ADJUSTABLE TRAILER HITCH

(71) Applicant: Tractor Supply Company, Brentwood, TN (US)

(72) Inventors: Brian Kennemer, Brentwood, TN (US); Ty Rager, Hendersonville, TN (US); Adam Prater, Thompsons Station, TN (US)

(73) Assignee: Tractor Supply Company, Brentwood, TN (US)

( * ) Notice: Subject to any disclaimer, the term of this patent is extended or adjusted under 35 U.S.C. 154(b) by 0 days.

(21) Appl. No.: 14/831,431

(22) Filed: Aug. 20, 2015

(51) Int. Cl.
*B60D 1/07* (2006.01)
*B60D 1/02* (2006.01)
*B60D 1/06* (2006.01)

(52) U.S. Cl.
CPC . *B60D 1/07* (2013.01); *B60D 1/02* (2013.01); *B60D 1/06* (2013.01)

(58) Field of Classification Search
CPC .......... B60D 1/07; B60D 1/06; B60D 1/075; B60D 1/01; B60D 1/02
USPC ....................................................... 280/416.3
See application file for complete search history.

(56) References Cited

U.S. PATENT DOCUMENTS

| | | | |
|---|---|---|---|
| 3,393,924 A * | 7/1968 | Silver | B60D 1/07 280/461.1 |
| 3,664,686 A | 5/1972 | Anderson | |
| 3,963,264 A | 6/1976 | Down | |
| 5,343,720 A | 9/1994 | Slater | |
| 5,725,229 A | 3/1998 | McWethy | |
| 6,857,650 B2 | 2/2005 | Ward | |
| 6,974,148 B2 | 12/2005 | Moss et al. | |
| 7,044,494 B1 | 5/2006 | Cowett | |
| D526,252 S | 8/2006 | Lambros | |
| D553,058 S | 10/2007 | Chen et al. | |
| 7,377,536 B2 * | 5/2008 | Rehme | B60D 1/065 280/483 |
| 7,850,192 B2 | 12/2010 | Ceccarelli et al. | |
| 8,371,603 B2 * | 2/2013 | Columbia | B60D 1/06 280/504 |
| 8,534,695 B2 | 9/2013 | Columbia | |
| 8,684,389 B2 | 4/2014 | Gries | |
| 8,840,130 B2 * | 9/2014 | Columbia | B60D 1/06 280/504 |

* cited by examiner

*Primary Examiner* — Kevin Hurley
*Assistant Examiner* — Michael Stabley
(74) *Attorney, Agent, or Firm* — Lucian Wayne Beavers; Patterson Intellectual Property Law PC

(57) ABSTRACT

A multi-use trailer hitch configured to allow a single hitch to be used for multiple trailer couplers. The hitch includes a ball and pin member attached to the yoke so that the hitch can couple with a Lunette eye ring coupler and a ball hitch coupler. The ball and pin member is designed to fit on the yoke and be easily secured with a retainer pin.

19 Claims, 4 Drawing Sheets

MULTI-USE ADJUSTABLE TRAILER HITCH

BACKGROUND OF THE INVENTION

1. Field of the Invention

The present invention relates to trailer hitches capable of coupling with multiple types of trailer connectors.

2. Description of the Prior Art

The typical farm hitch is a single purpose hitch that allows a trailer to be coupled to a towing vehicle for transportation and use. Many varieties of connection exist and require separate coupling structures. Two common coupling structures are the ball hitch and the Lunette eye ring hitch. A ball hitch includes a shank and a ball where the trailer coupler may rest and be secured to the hitch. The Lunette eye ring hitch includes a ring connector on the trailer that inserts into a collar. A pin runs through the ring to secure the trailer to the vehicle. With various possible couplings, it is desirable to have a hitch capable of connecting with many of the common couplings so that users are not required to have multiple hitches available. While other multi-use trailer hitches exist, there is a continuing need for improved multi-use trailer hitches.

SUMMARY OF THE INVENTION

In one embodiment a multi-use trailer hitch includes a yoke with two flanges opposing each other. Each flange may have a hole aligned with the hole in the other flange. The hitch also includes a ball and pin member having a trailer ball, a ring coupler pin and a plate. The plate includes two ears on opposite sides of the plate and each ear includes a retainer pin opening. The ring coupler pin may fit into the yoke flange holes. The ball and pin member may be secured to the yoke with a retainer pin running through the openings in the plate ears and between the two yoke flanges.

In another embodiment a multi-use trailer hitch assembly includes a drawbar that connects to the towing vehicle, an adjustable yoke assembly, and a ball and pin member. The drawbar includes a horizontal shank and a vertical shank connected together. The horizontal shank provides a connection to the towing vehicle and the vertical shank includes at least one set of holes allowing a yoke to attach to the vertical shank, but may include more holes to allow the user to adjust the height of the hitch. The adjustable yoke assembly includes a yoke and a bracket. The yoke includes two flanges, one flange including a hole. The bracket includes two arms spaced apart to be received by the vertical shank. Each arm has at least one hole for connecting to the vertical shank, but may have more holes for more stable connections. The ball and pin member includes a plate, a trailer ball, and a ring coupler pin assembled together. The ball and pin member is passed through the flange hole and secured to the yoke with a retainer pin extending from each side of the plate and between the yoke flanges. The adjustable yoke assembly is connected to the vertical shank with locking pins passing through the holes in the bracket and the vertical shank.

In another embodiment a method of using a multi-use trailer hitch comprises the steps of:

(a) connecting a drawbar to the to the towing vehicle;

(b) attaching a yoke to the drawbar, the yoke including a first flange having a proximal hole and a second flange having a distal hole;

(c) placing a ring coupler between the yoke flanges;

(d) inserting a ball and pin member through the proximal hole, the ring coupler, and into the distal hole to connect the ring coupler to the yoke, the ball and pin member including a ball, a pin, and a cover including two opposing ears extending toward the second flange and each ear having a retainer pin opening; and (e) securing the ball and pin member to the yoke by engaging the retainer pin openings with a retainer pin located between the first flange and the second flange.

In any of the above embodiments the plate may include a plate hole and the trailer ball and ring coupler pin may be integrally formed so that they are one piece, such as with a single piece casting. The trailer ball and ring coupler may then pass through the plate hole and the trailer ball may be welded to the plate to create the ball and pin member.

In any of the above embodiments the retainer pin may be placed such that the retainer pin outer surface is no further than half the retainer pin diameter from the flange holding the ball and pin member.

In any of the above embodiments one of the flanges may also have a secondary trailer ball, possibly of a different size, attached to the flange.

In any of the above embodiments the yoke flanges and the yoke vertical wall may have a chamfered surface between the flanges and the vertical wall.

In any of the above embodiments the plate may have two ears opposing each other and free edges at any remaining sides to allow the plate to slide onto the flange.

In any of the above embodiments both flanges may include a hole for the ring coupler pin to pass through.

In any of the above embodiments the retainer pin may include a fastener to lock the retainer pin in place in relation to the yoke.

In any of the above embodiments the bracket connecting the yoke to the vertical shank may contain two holes in each arm.

In any of the above embodiments a reinforcing rib may be placed between the vertical shank and the horizontal shank.

Numerous objects, features, and advantages of the present invention will be readily available to those skilled in the art upon the reading of the following disclosure when taken in conjunction with the accompanying drawings.

DETAILED DESCRIPTION

Figure 1:
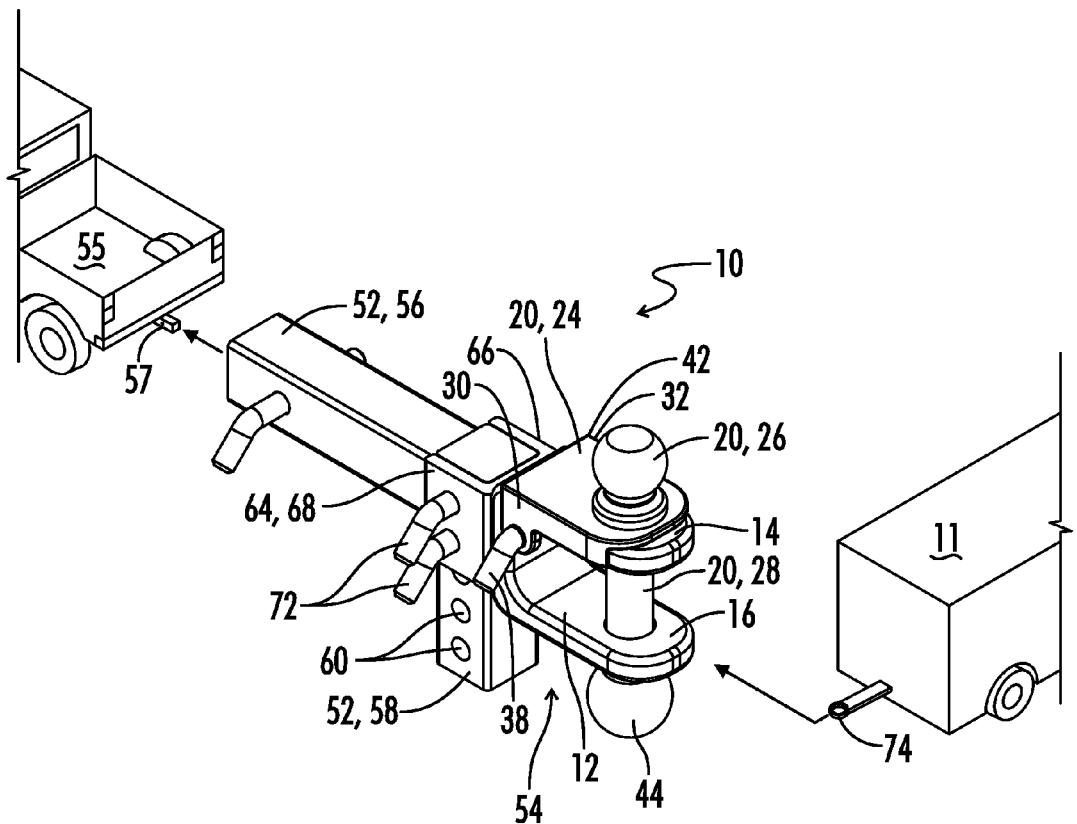
FIG. 1 is a perspective view of the multi-use trailer hitch of the present invention in relation to a towing vehicle and a trailer.

Referring now to the drawings, and particularly to FIG. 1, a trailer hitch apparatus is shown and designated by the numeral 10. The trailer hitch includes a drawbar 52 and an adjustable yoke assembly 54. Drawbar 52 may be attached to the adjustable yoke assembly 54 to connect adjustable yoke assembly 54 to a towing vehicle 55. Drawbar 52 includes a horizontal shank 56 and a vertical shank 58. Horizontal shank 56 connects to a receiver 57 of towing vehicle 55. Vertical shank 58 includes a plurality of bores 60 to allow adjustable yoke assembly 54 to connect to vertical shank 58. A plurality of bores allow for added stability and height adjustment of adjustable yoke assembly 54. A support rib 62 may also be placed between horizontal shank 56 and vertical shank 58 for added structural support.

Adjustable yoke assembly 54 may include a yoke 12 to attach the trailer hitch 10 to a trailer 11, and a bracket 64 that connects adjustable yoke assembly 54 to vertical shank 58. Yoke 12 may include two flanges, 14 and 16, to provide the different hitch connectors. Flange 14 may have a proximal hole 18 to allow a ball and pin member 20 to pass through. Flange 16 may include a distal hole 22 aligned vertically with proximal hole 18.

Yoke 12 may also include a secondary trailer ball 44 connected to flange 16. Secondary trailer ball 44 may be a different size than trailer ball 26 to provide an additional hitch connector option.

Further, yoke 12 may include a vertical wall 48. The connection between vertical wall 48 and flange 14 may also include a chamfer 46 between flange 14 and vertical wall 48. The connection between vertical wall 48 and flange 16 may also include a chamfer 50 between flange 16 and vertical wall 48.

Figure 3:
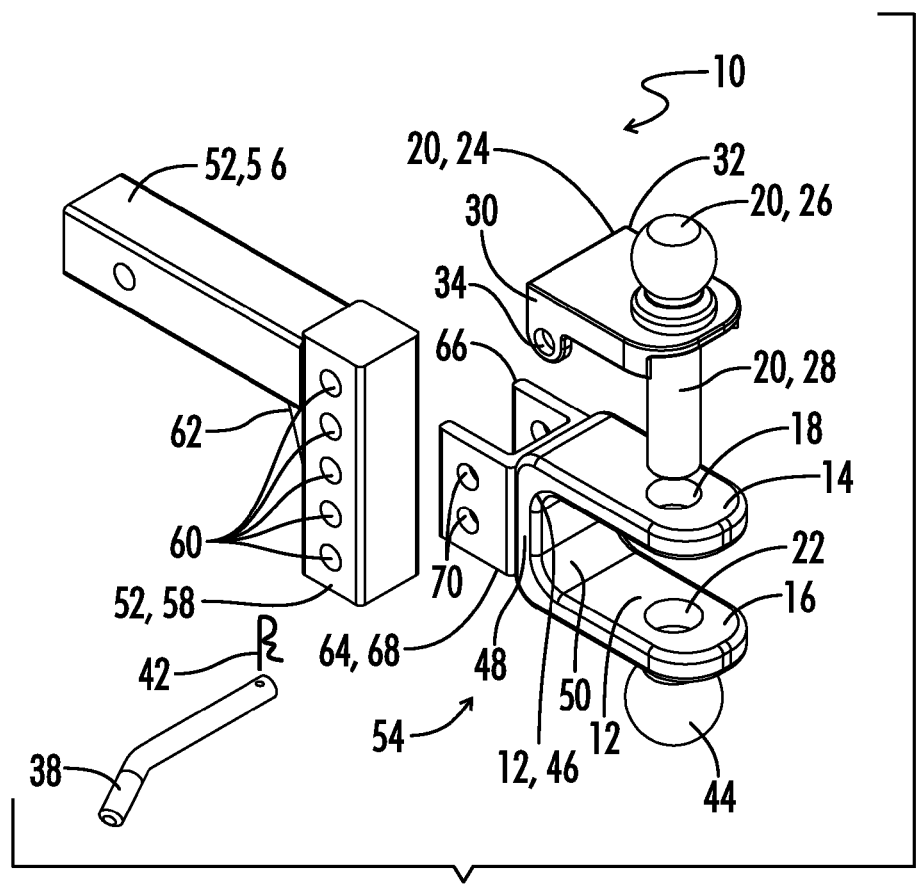
FIG. 3 is an exploded view of the multi-use trailer hitch of FIG. 1.
Figure 4:
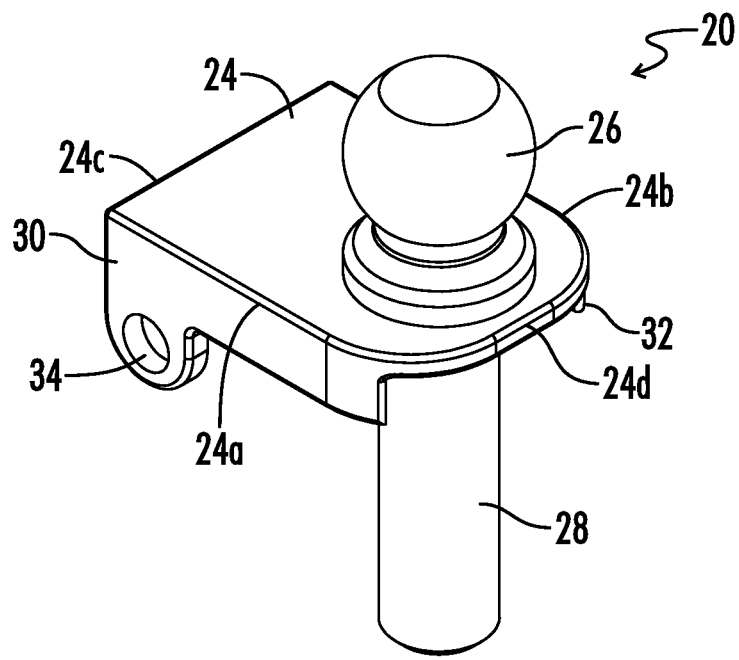
FIG. 4 is a perspective view of the ball and pin member.
Figure 5:
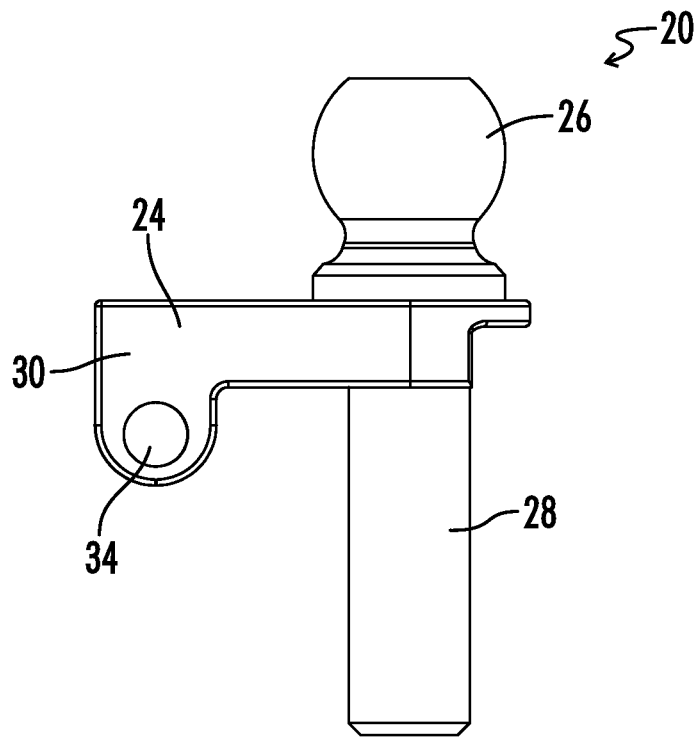
FIG. 5 is a side view of the ball and pin member of FIG. 4.

As is best shown in FIG. 3, bracket 64 includes two parallel arms 66 and 68 spaced apart to receive vertical shank 58. Arms 66 and 68 may each include a plurality of arm holes 70 for locking pins 72 to pass through. Locking pins 72 pass through arm holes 70 and bores 60 to connect adjustable yoke assembly 54 to drawbar 52.

Figure 2:
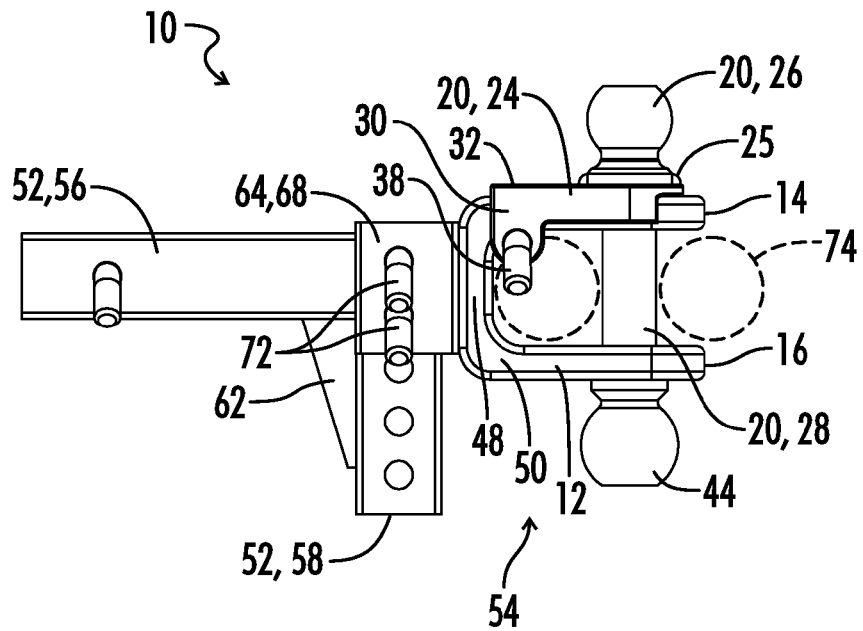
FIG. 2 is a side view of the multi-use trailer hitch of FIG. 1, showing the location of a Lunette ring in dashed lines.
Figure 6:
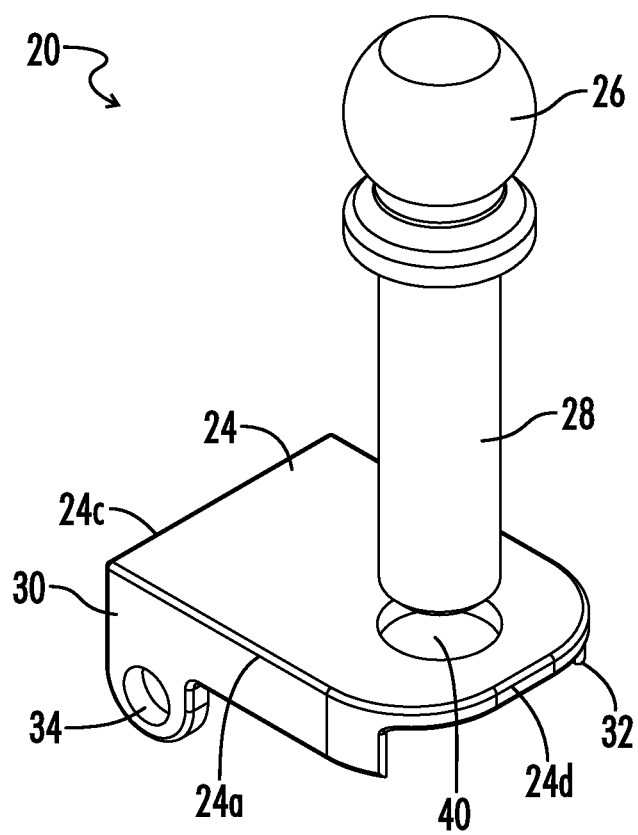
FIG. 6 is an exploded view of the ball and pin member of FIG. 4.

As seen best in FIG. 6, ball and pin member 20 may include a plate 24, a trailer ball 26, and a ring coupler pin 28. Plate 24 may also be referred to as cover 24. Plate 24 may have two ears, 30 and 32, extending from two opposing sides of plate 24. Each of the ears 30 and 32 may have a retainer pin opening, such as 34, to allow a retainer pin 38, also known as retainer 38, to secure ball and pin member 20 to yoke 12. Retainer pin openings 34 may also be called retainer openings 34. Ring coupler pin 28 may also be called ring pin 28. In one embodiment trailer ball 26, and ring coupler pin 28 may be integrally formed together, such as by single piece casting. Plate 24 may further include a plate hole 40, also known as cover hole 40, for ring coupler pin 28 to pass through and trailer ball 26 may be welded to plate 24 as indicated at 25 in FIG. 2. Ball and pin member 20 may be secured to yoke 12 by inserting ring coupler pin 28 through proximal hole 18 such that plate 24 rests on top of flange 14 with ears 30 and 32 extending between flanges 14 and 16.

Plate 24 may include two lateral sides 24a and 24b, a tow side 24c, and a trailer side 24d. The tow side 24c of plate 24 is the side closest to towing vehicle 55 when ball and pin member 20 is attached to yoke 12. The trailer side 24d is the side of plate 24 closest to trailer 11 when ball and pin member 20 is attached to yoke 12. The two lateral sides 24a and 24b may have opposing ears 30 and 32, respectively, extending from the sides while the tow side 24c and trailer side 24d may have free edges to allow plate 24 to fit flush onto flange 14. Ears 30 and 32 may have retainer pin openings 34 positioned such that retainer pin 38 is closer to the tow side of plate 24 than to ring coupler pin 28.

Retainer pin 38 may be inserted into retainer pin openings 34 to secure ball and pin member 20 to yoke 12. A fastener 42 may secure retainer pin 38. Ears 30 and 32 may extend past flange 14 such that retainer pin 38 may be secured in a position where the surface of retainer pin 38 is no further than half the retainer pin diameter from flange 14.

A method of using multi-use trailer hitch 10 to connect to a Lunette eye ring 74 may generally be described as including the steps:

(a) connecting drawbar 52 to receiver 57 to connect the drawbar to towing vehicle 55;

(b) attaching yoke 12 to drawbar 52 with bracket 64, which may include orienting yoke 12 such that proximal hole 18 and distal hole 22 are vertically aligned;

(c) placing Lunette eye ring 74 between flanges 14 and 16;

(d) inserting ball and pin member 20 through proximal hole 18, Lunette eye ring 74, and distal hole 22; and (e) securing ball and pin member 20 to yoke 12 by inserting retainer pin 38 through retainer pin openings 34 and 36 positioned between flanges 14 and 16.

Step (e) may further include securing retainer pin 38 at a position no further than half the retainer pin diameter from flange 14. Retainer pin 38 may also be placed closer to yoke 12's closed end than to ring coupler pin 28. Both possibilities are used to more securely connect yoke 12 and ball and pin member 20.

Therefore it can be seen that the methods and apparatus of the present invention achieve the goals mentioned and the goals inherent in the present invention. Though certain embodiments have been described in the present disclosure, there are other variations that will occur to those skilled in the art which are also encompassed in the present invention as defined by the appended claims.

What is claimed is:

1. A multi-use trailer hitch, comprising:
   a yoke including a first flange having a proximal hole, and a second flange having a distal hole aligned with the proximal hole;
   a ball and pin member comprising:
      a plate including two opposed ears, each of the ears including a retainer pin opening;
      a trailer ball; and
      a ring coupler pin, and wherein the plate, the trailer ball, and the ring coupler pin are connected together to form the ball and pin member, the ring coupler pin being received through the proximal hole and into the distal hole with the plate engaging the first flange and the ears extending toward the second flange; and
   a retainer pin received through the retainer pin openings and extending between the first and second flanges to secure the ball and pin member to the yoke.

2. The multi-use trailer hitch of claim 1, wherein:
   the plate includes a plate hole; and
   the trailer ball and the ring coupler pin are integrally formed together, the ring coupler pin being received through the plate hole and the trailer ball being welded to the plate.

3. The multi-use trailer hitch of claim 1, wherein:
   the retainer pin has a diameter and includes a surface positioned at a maximum of half the diameter of the retainer pin from the first flange.

4. The multi-use trailer hitch of claim 1, further comprising:
   a secondary trailer ball attached to the second flange.

5. The multi-use trailer hitch of claim 1, wherein the yoke further comprises:
   a vertical wall including a first end connected to the first flange and having a first chamfer between the vertical wall and the first flange, the vertical wall further including a second end connected to the second flange and having a second chamfer between the vertical wall and the second flange.

6. A multi-use trailer hitch, comprising:
a drawbar including a horizontal shank having a first end for connecting to a towing vehicle and a second end, the drawbar further including a vertical shank attached to the second end of the horizontal shank, the vertical shank having one or more vertical shank bores passing through the vertical shank;
an adjustable yoke assembly including:
a yoke including a first flange and a second flange, the first flange having a proximal hole; and
a bracket attached to the yoke, the bracket including two parallel arms spaced apart to receive the vertical shank and at least one arm hole in each arm; and
a ball and pin member including:
a cover including at least two retainer openings;
a trailer ball; and
a ring pin received through the proximal hole, and the cover engaging the first flange and the cover extending towards the second flange, wherein the cover, the trader ball, and the ring pin are connected together to form the bail and pin member;
a retainer engaging the retainer openings and extending between the first and second flanges to secure the ball and pin member to the yoke; and
at least one locking pin received by the arm holes and the vertical shank bores to connect the drawbar and the adjustable yoke assembly.

7. The multi-use trailer hitch of claim 6, wherein the ball and pin assembly further comprises:
the cover including a cover hole; and
the trailer ball and the ring pin are integrally formed together, the ring pin being received through the cover hole and the trailer ball being welded to the cover.

8. The multi-use trailer hitch of claim 6, wherein the cover further comprises:
a cover plate including two lateral sides, a tow side, and a trailer side;
an ear extending from each of the lateral sides; and
the tow and trailer sides having free edges.

9. The multi-use trailer hitch of claim 6, wherein the cover further comprises:
a cover plate including two lateral sides, a tow side, and a trailer side; and
an ear extending from each of the lateral sides, each ear having a hole closer to the cover plate tow side than to the ring pin when the ball and pin member is engaged with the yoke.

10. The multi-use trailer hitch of claim 6, wherein:
the second flange further includes a distal hole; and
the ring pin is received in the distal hole.

11. The multi-use trailer hitch of claim 6, wherein the retainer further comprises:

a retainer pin received through the retainer openings and including a fastener to secure the retainer pin in place within the retainer openings of the cover.

12. The multi-use trailer hitch of claim 6, wherein:
the retainer has a diameter and includes a surface positioned at a maximum of half the diameter of the retainer from the first flange.

13. The multi-use trailer hitch of claim 6, wherein the adjustable yoke assembly further comprises:
a secondary trailer ball attached to the second flange.

14. The multi-use trailer hitch of claim 6, wherein the yoke further comprises:
a vertical wall including a first end connected to the first flange having a first chamfer between the vertical wall and the first flange, the vertical wall further including a second end connected to the second flange having a second chamfer between the vertical wall and the second flange.

15. The multi-use trailer hitch of claim 6, wherein:
the at least one arm hole in each arm includes at least two arm holes in each arm.

16. The multi-use trailer hitch of claim 6, wherein the drawbar further comprises:
a reinforcing rib connected to the horizontal shank and the vertical shank.

17. A method of using a multi-use trailer hitch, comprising:
connecting a drawbar to a towing vehicle;
attaching a yoke to the drawbar, the yoke including a first flange having a proximal hole and a second flange having a distal hole;
placing a ring coupler between the first and second flanges;
inserting a ball and pin member through the proximal hole, the ring coupler, and into the distal hole to connect the ring coupler to the yoke, the ball and pin member including a ball, a pin, and a cover including two opposing ears extending toward the second flange and each ear having a retainer pin opening; and
securing the ball and pin member to the yoke by engaging the retainer pin openings with a retainer pin located between the first flange and the second flange.

18. The method of claim 17, wherein the attaching step further comprises:
orienting the yoke such that the proximal hole is vertically aligned above the distal hole.

19. The method of claim 17, wherein the securing step further comprises:
securing the retainer pin at a position closer to a closed end of the yoke than to the ring coupler, the retainer pin including a diameter and an outer surface, the outer surface being positioned at a maximum of half the diameter of the retainer pin from the first flange.

* * * * *